United States Patent [19]

Davis, Jr. et al.

[11] 3,771,987

[45] Nov. 13, 1973

[54] APPARATUS FOR CONVEYING A GLASS RIBBON

[75] Inventors: Curtis W. Davis, Jr.; Robert W. Fern, both of Toledo, Ohio

[73] Assignee: Libbey-Owen-Ford Company, Toledo, Ohio

[22] Filed: Apr. 5, 1971

[21] Appl. No.: 131,000

[52] U.S. Cl. .................... 65/172, 65/182 A, 65/196
[51] Int. Cl. ............................................ C03b 15/02
[58] Field of Search ................... 65/172, 182 A, 196, 65/197, 198

[56] References Cited
UNITED STATES PATENTS
3,573,026 3/1971 Maltby, Jr. et al. ............... 65/182 A
2,683,332 7/1954 Litalien et al. ........................ 65/172

*Primary Examiner*—Arthur D. Kellogg
*Attorney*—Collins & Oberlin

[57] ABSTRACT

The invention pertains to an improved contoured roll for supporting a continuous sheet of glass in a highly heated, plastic state while being conveyed over the curvilinear surface of the roll supported out of contact therewith on a film formed by an aeriform fluid escaping from an elongated slot in the adjacent surface extending transversely of the sheet and terminating close to either end of the roll. The end portions of the surface of the support roll flanking the slot, which are most susceptible to wear by intermittent contact with the sheet, are replaced by shaped inserts having a surface blending with the surrounding contour. The inserts can readily be removed and replaced when worn, thereby greatly reducing the amount of maintenance and extending the useful life of the roll.

6 Claims, 9 Drawing Figures

PATENTED NOV 13 1973

INVENTORS
Curtis W. Davis, Jr., and
BY Robert W. Fern
Collins & Oberlin
ATTORNEYS

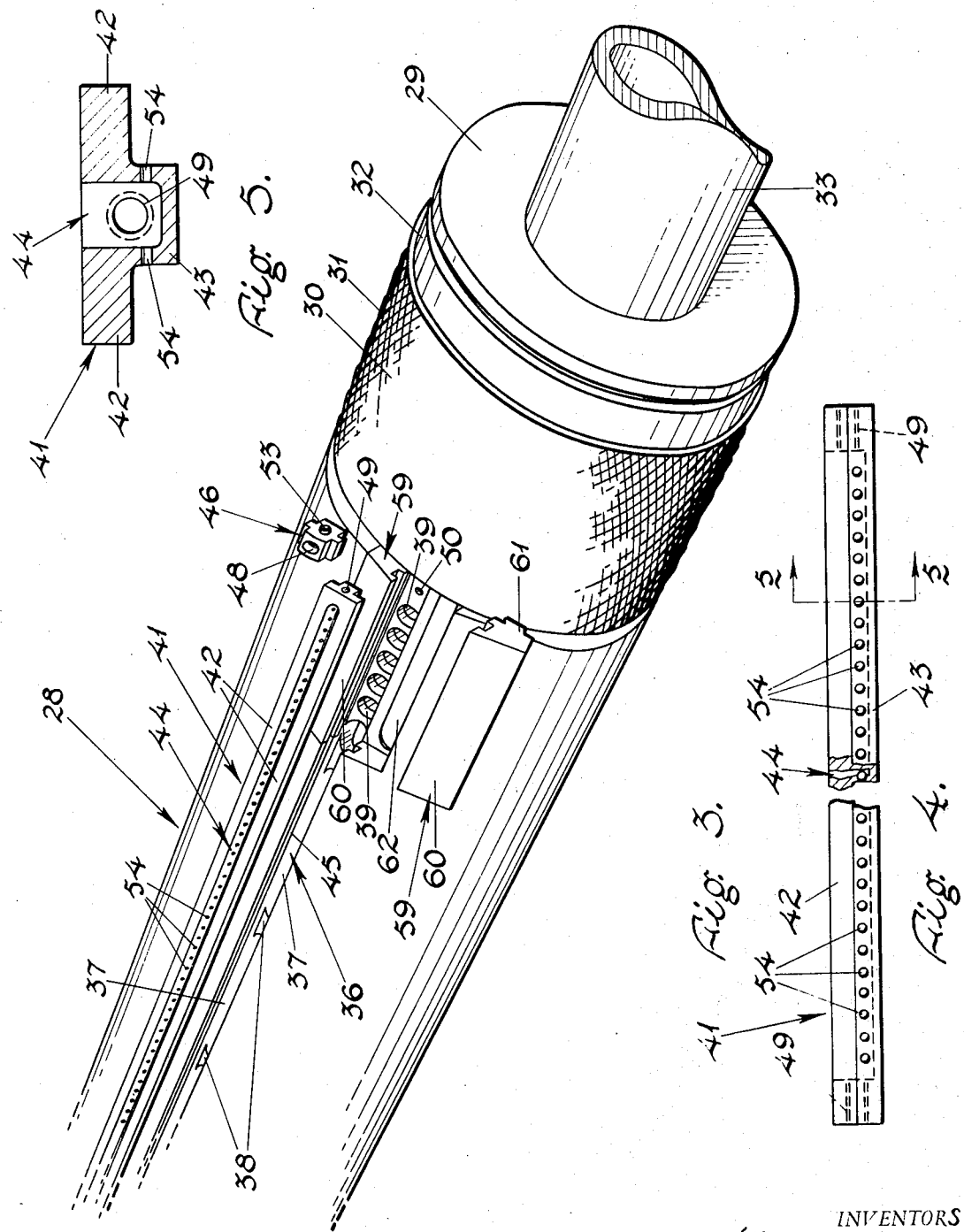

INVENTORS
Curtis W. Davis, Jr., and
Robert W. Fern
BY
Collins & Oberlin
ATTORNEYS INVENTORS
Curtis W. Davis Jr., and
Robert W. Fern
BY Collins & Oberlin
ATTORNEYS

APPARATUS FOR CONVEYING A GLASS RIBBON

BACKGROUND OF THE INVENTION

1. Field of the Invention

The present invention relates broadly to the manufacture of sheet or window glass by the so-called Colburn process and, more particularly, to an improved means for supporting the sheet or ribbon of glass as it is continuously drawn upward from a mass of molten glass and deflected into a substantially horizontal plane for passage through a contiguous annealing lehr.

2. Description of the Prior Art

One form of "window" or "sheet" glass apparatus is illustrated and described in U. S. Pat. No. 3,476,539, issued Nov. 4, 1969. As therein explained "window" or "sheet" glass, which is flat, drawn glass having fire polished surfaces attained during the formation of the sheet, in contrast with "plate" glass which has mechanically ground and polished surfaces, is conventionally produced by drawing a sheet or ribbon of glass upward from a mass of molten glass and, while in a highly heated, pliable condition, deflecting it over a so-called bending roll into a substantially horizontal disposition and thereafter carrying the sheet through an adjacent annealing lehr where it is cooled under controlled conditions. Direct contact between the bending roll and the glass sheet, however, has proved to be undesirable for several reasons. Slight imperfections which exist in the roll surface are easily imprinted on the undersurface of the plastic sheet, thereby adversely affecting the surface quality of the glass and creating therein the undesirable condition known as "bottom dirt." In addition, the combination of these imperfections with the difference in temperature between the roll and the sheet cause an undesirable condition on the bottom of the sheet known in the art as "sheen."

In order to avoid this direct contact between the sheet and the bending roll and thereby eliminate the associated undesirable effects on the glass produced, the above-mentioned U. S. patent proposes to provide the roll or supporting surface with an elongated longitudinal slot beneath the sheet, through which an aeriform fluid such as air is forced to create a thin uniform film between the roll surface and the sheet. During such production, the roll remains stationary and the sheet is carried thereover on the film out of contact with the roll.

With these so-called "air-float" bending rolls, the sheet has exhibited a tendency to drag over and in contact with the roll at the outer edges of the central, slotted segment thereof. The roll is conventionally fitted with a plug at either end of the slot to prevent loss of fluid from the ends thereof. This, in effect, terminates the slot a short distance from either end of the central roll section and, combined with the natural loss of fluid at the edges of the sheet, results in less outward lifting force being applied by the fluid to the marginal portions of the sheet which often extend several inches beyond the central roll section in either direction. Thus, the sheet in its highly plastic state may periodically droop slightly and drag over the roll in these areas. This periodic dragging results in a disproportionate amount of wear at these areas of the roll and, since the end areas of the rolls heretofore employed have been formed integrally with the main roll body, machining and other expensive maintenance costs are incurred quite frequently to maintain the desired roll contour at the end of the central tubular section.

SUMMARY OF THE INVENTION

According to the present invention, replaceable inserts having surfaces contoured to match the adjacent roll surface are provided flanking the ends of the slot in the bending roll. The problems associated with excessive wear in these areas of the roll are thus greatly reduced since the shaped inserts may simply be removed and replaced when worn.

It is therefore a primary object of the present invention to increase roll life and eliminate repeated rebuilding and machining requirements associated with the dragging of the sheet across the end portions of the bending roll.

Another object is the provision of readily replaceable inserts at the points of greatest wear in the bending roll.

Still another object is to provide such inserts having a surface contour blending with that of the adjacent roll surface.

Other objects and advantages of the invention will become more apparent during the course of the following description when taken in connection with the accompanying drawings.

BRIEF DESCRIPTION OF THE DRAWINGS

In the drawings wherein like numerals are employed to designate like parts throughout the same:

FIG. 3 is an enlarged, partially exploded perspective view of one end of the bending roll illustrating the slot and associated fluid mixer and end inserts of the invention;

FIG. 4 is an enlarged side elevational view of the fluid mixer insert of FIG. 3;

FIG. 5 is an enlarged transverse sectional view taken substantially along line 5—5 of FIG. 4;

DESCRIPTION OF THE PREFERRED EMBODIMENTS

While the invention is illustrated and described herein with particular regard to the Colburn process of producing window glass, for which it is particularly well suited, it is contemplated that the invention is readily adaptable for use in the conveyance of plastic or flexible materials generally, including, for example, removal of the ribbon from the exit end of the molten metal bath in the so-called float process of producing flat glass.

Figure 1:
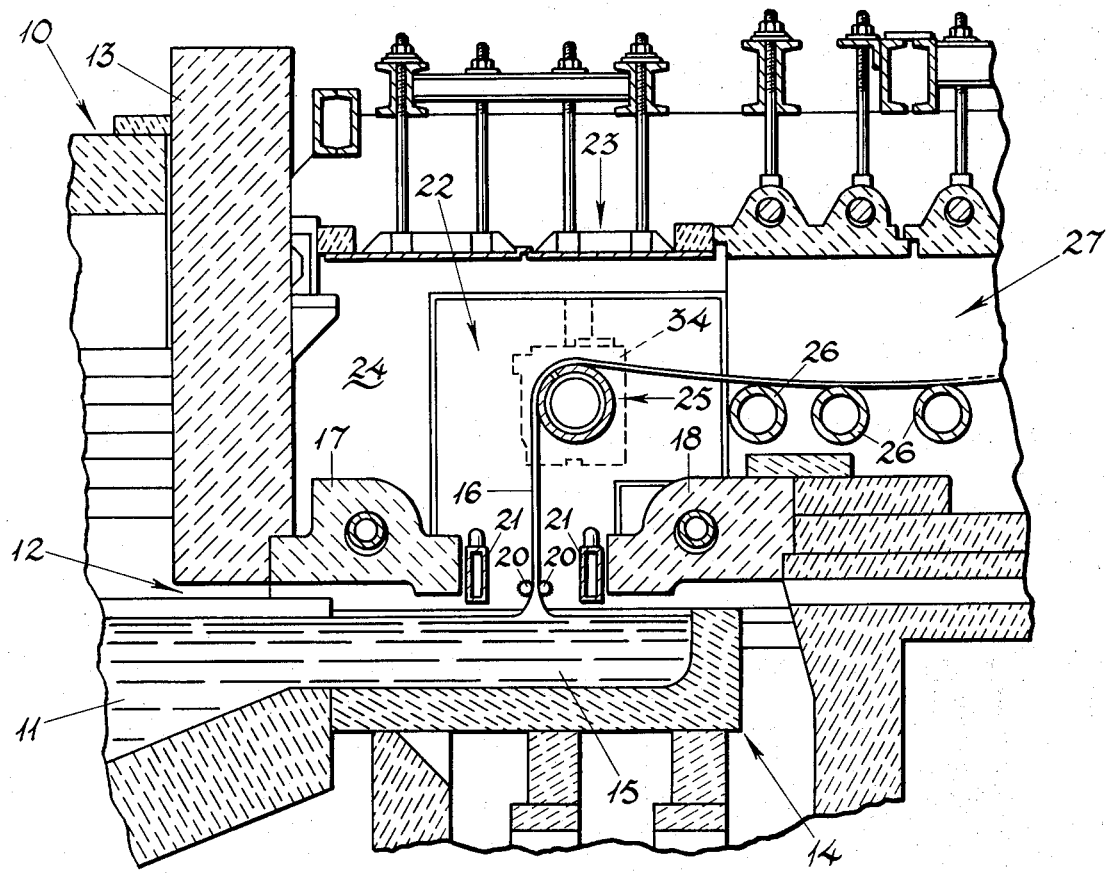
FIG. 1 is a longitudinal vertical sectional view of the working area of a sheet glass furnace and flattening section of the adjacent annealing lehr illustrating a bending roll embodying the invention.

Referring now to the drawings, and in particular to FIG. 1, there is shown generally at 10 the outlet end of the cooling chamber of a continuous tank furnace in which a mass of molten glass is continually produced, refined and cooled to proper working temperature. The molten glass, indicated at 11, flows from the cooling chamber through an opening 12 beneath a cooling chamber curtain wall 13 into a working receptacle or drawpot 14 to maintain a relatively shallow pool of molten glass 15 from which a sheet or ribbon 16 is continuously drawn. Front and rear lip-tiles 17 and 18 located over the molten glass at the entry or front end and rear, respectively, of the drawpot create a quiescent zone over the molten glass through which the sheet is drawn during its formative stage.

Pairs of knurled rolls 20 engage the emerging sheet along either marginal edge to establish and maintain it at the desired width, and coolers 21 are located opposite either surface in the usual fashion to absorb heat from the passing sheet and promote the initial setting thereof as it is drawn upward. The sheet 16 rises vertically for a short distance within a drawing chamber 22, defined by the curtain wall 13, a roof 23 and oppositely disposed side walls 24, is then deflected about a bending member 25, achieving a substantially horizontal disposition, and thereafter carried on a series of spaced rolls 26 through an adjacent annealing lehr, the initial portion or flattening chamber of which is indicated at 27, where controlled cooling of the sheet takes place. It should be noted that although from the moment the glass is first drawn upward out of the drawpot, cooling of the sheet is taking place and by the time the sheet reaches the level of the bending roll 25, it is substantially set in its final form, it is still in a highly heated, plastic state and readily subject to deformation when it encounters the bending roll and for some distance thereafter.

Since the present invention is concerned only with that segment of the process wherein the sheet is deflected about the bending roll and established on the horizontal conveying means of the lehr, only that portion of both the furnace and the bending roll pertinent to a proper understanding of the invention has been shown and described.

The bending member 25, as shown partially in FIG. 3, is generally cylindrical in shape and has a central, tubular sheet-supporting section 28 whose ends receive tubular extensions 29 on which free wheeling sleeves 30 having knurled surfaces 31 are journaled and stationary collars 32 are fixed for a purpose to be described. Bearing or trunnion sections comprising tubular sections of reduced diameter are affixed to the tubular extensions 29, the initial section of which is shown partially at 33. The trunnions are received in bearings (not shown) without the chamber and rotatably carry the bending member. Although not shown in the drawings, the aeriform fluid is supplied from a pressurized source in a conventional manner to a pipe extension secured to the outer end of each bearing secton.

While during normal operation of the drawing process the bending member 25 remains stationary and the sheet is carried thereover on a supporting fluid cushion, at such times as, for example, when the member is initially installed, during the starting of the sheet and at other times when operating difficulties are encountered, it may be necessary that the member be rotated and operated in the manner of a conventional bending roll. Thus, to accomplish this objective, one end of the journaled shaft is connected in a customary manner to a conventional drive system having an overriding clutch, shown generally in broken lines at 34 in FIG. 1, and the other end is left free to rotate in bearings as described above. Positive stops (not shown) fix the roll in the desired position during normal stationary operation.

Figure 6:
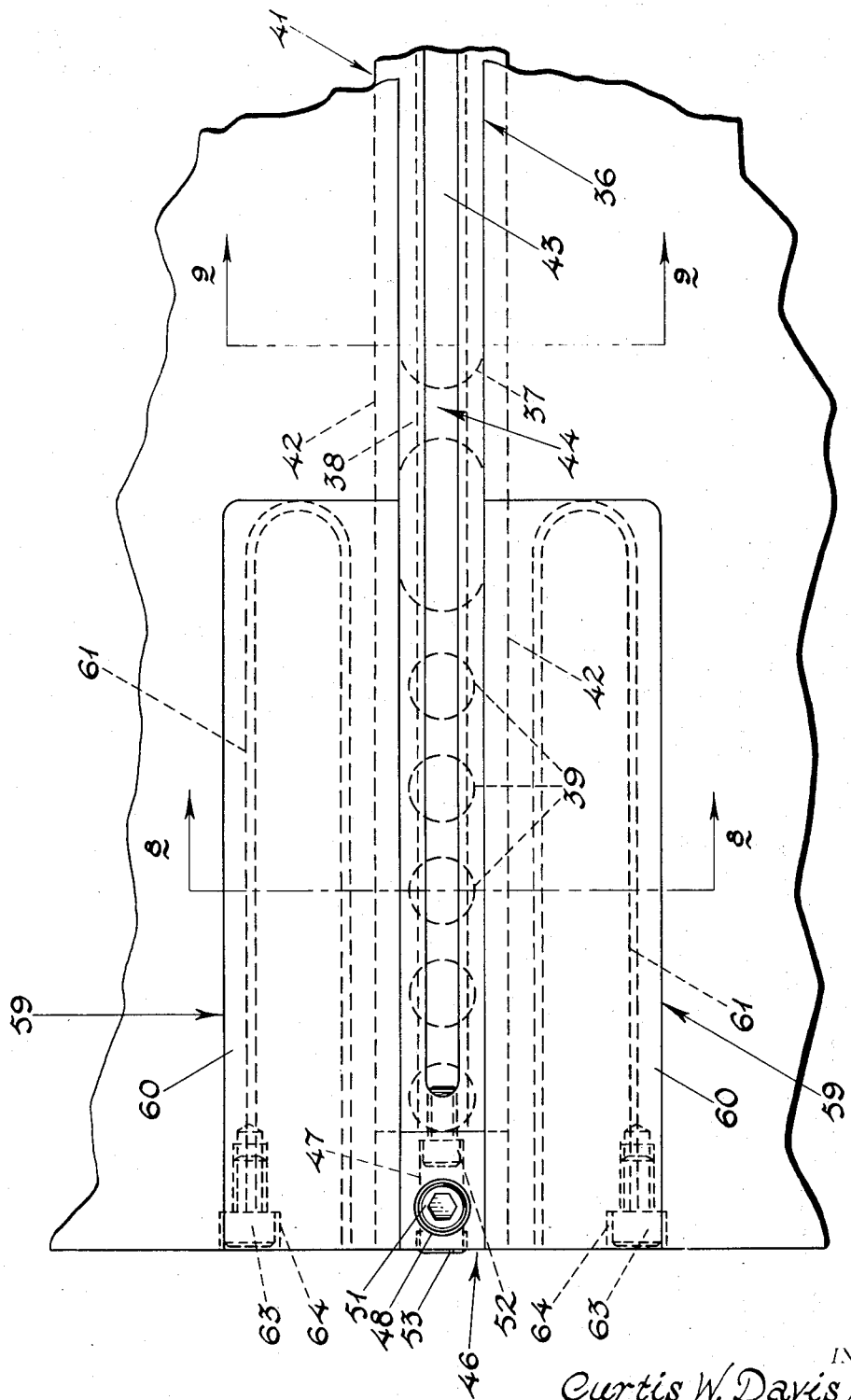
FIG. 6 is an enlarged fragmentary plan view of one end of the central roll section showing the distribution slot and the wear inserts of the invention.
Figure 9:
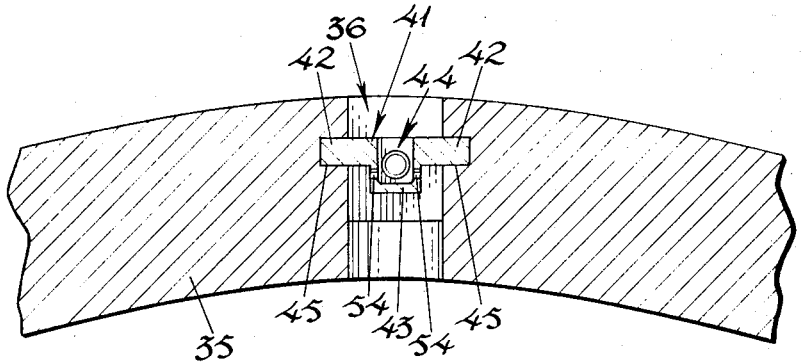
FIG. 9 is a fragmentary transverse sectional view taken substantially along line 9—9 of FIG. 6, similar to FIG. 8 but showing the distribution slot beyond the wear inserts of the invention.

As best shown in FIGS. 3, 6 and 9, the wall 35 of the central tubular section 28 is provided with a continuous recess or fluid supply slot 36 extending along its entire length. The slot maintains continuous communication with the hollow interior of the member 28 through a plurality of shorter central slots 37, flanked by ribs 38, and end holes 39 which extend through the remainder of the wall 35 below the main recess 36. The interior volume 40 is maintained as a constant pressure plenum chamber by the continual admission of the fluid medium through the direct connected supply system mentioned above, the fluid so admitted being expelled throughout the length of the slot 36 to disperse and form the sheet supporting film.

Figure 7:
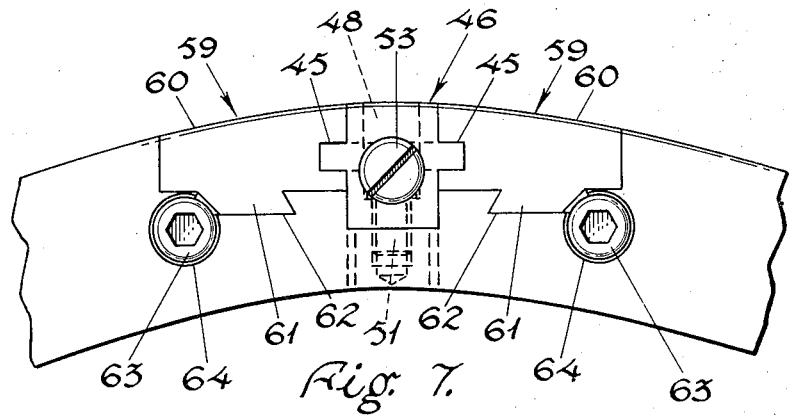
FIG. 7 is an enlarged fragmentary end view of one end of the central sheet supporting section of the bending roll showing the wear inserts of the invention.
Figure 8:
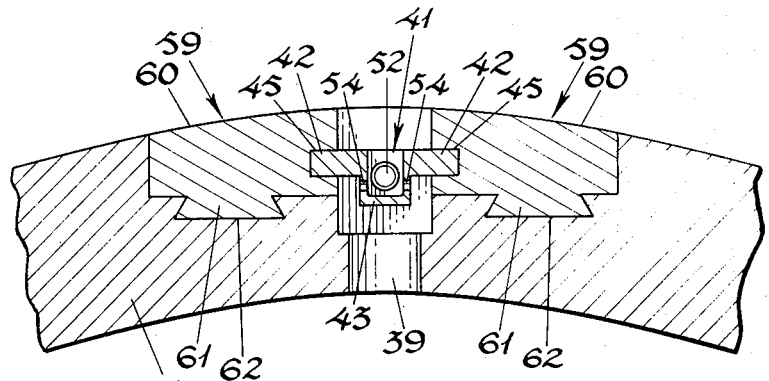
FIG. 8 is a fragmentary transverse sectional view taken substantially along line 8—8 of FIG. 6.

In order to prevent undesirable longitudinal streaking of the glass sheet in its highly plastic state, a condition which may originate from the tendency of the fluid to impinge on the undersurface of the sheet with varying degrees of intensity along the central tubular member 28, and to promote an even distribution of the fluid in the area of contact with the sheet, a fluid dispersing member or mixer insert is located in the slot. One form of mixer insert which has been successfully used is indicated generally at 41 (FIGS. 3–5). The mixer insert is slightly shorter in length than the central tubular section 28 and is generally "U-shaped" having flanges 42 connected by a recessed central portion 43 containing a hollow air mixer slot 44. The flanges 42 are slidably received in corresponding grooves 45 in the side walls of the slot 36, centrally positioning the insert such that the recessed portion 43, being narrower and shallower than the adjacent portion of the slot 36, is surrounded by the volume of the slot on three sides. Suitable end closures, as plugs 46 inserted in the ends of the slot, prevent the lateral escape of the fluid medium. As best seen in FIGS. 3 and 7 the end plugs 46, which are preferably press fitted in the slot 36 for easy removal, may be fixed to both the mixer insert 41 and the wall 35. Thus, perpendicular intersecting holes 47 and 48 through the plug are, respectively, aligned with corresponding tapped holes 49 and 50 in the mixer insert and bottom of the slot 36, and the plug and mixer insert are fixed in place by screws 51 and 52. The tapped outer opening of hole 47 is finally sealed by an air seal plug 53 to prevent escape of the fluid through the holes in the plug 46. This construction, in effect, creates a second continuous pressure plenum chamber between the air mixer insert 41 and the extremes of the slot 36 of the central tubular section 28. The aeriform fluid is uniformly discharged into the air mixer slot 44 through rows of spaced, oppositely disposed holes 54 in the central portion 43 of the air mixer insert 41. The fluid is thus expelled into the slot 44 in a direction generally perpendicular to the direction of support of the ribbon 17, allowing the direct discharge velocity to be expended between oppositely discharging holes within the slot. In this manner any direct impingement of the fluid on the underside of the advancing sheet is effectively prevented and streaking of the sheet is eliminated. Also, the use of a large number of relatively small, spaced holes serves to distribute the escaping fluid evenly throughout the length of the mixer insert 41 providing a more uniform supporting film beneath the sheet 16.

The configuration of the surface of the sheet supporting member has been found to be an important factor in successfully deflecting the sheet about the bending member while supported on a fluid film out of contact with the supporting surface. As explained in detail in the above-mentioned U. S. Pat. No. 3,476,539, although by no means limited thereto, excellent results have been achieved where the radius of curvature of the contoured surface on opposite sides of the slot generally ever increases as a parabolic function from a minimum in the central region adjacent the slot to one approaching infinity at the points of tangency where the sheet approaches and departs from the surface. This relationship may be maintained regardless of whether the slot is located on the medial line of the contoured surface as it is sometimes desirable to deflect the sheet through a greater angle on one side of the slot than the other. This general configuration has been found to be a factor in minimizing the amount of fluid required to maintain the supporting film and therefore the amount of air or other supporting fluid escaping into the enclosed drawing chamber. This is an important consideration inasmuch as it is also necessary to maintain a quiescent atmosphere within the drawing chamber in the zone of sheet formation to prevent undesirable defects therein such as distortion and thickness variations. The fluid is also preheated, as by a conventional preheater (not shown), to a temperature of between 500° F. and 1,400° F. to prevent undue cooling of the sheet as the fluid film is formed therebeneath. Excessive cooling as the sheet is deflected may cause it to become too stiff so that it will not precisely follow the contoured surface, or even to crack and break.

Figure 2:
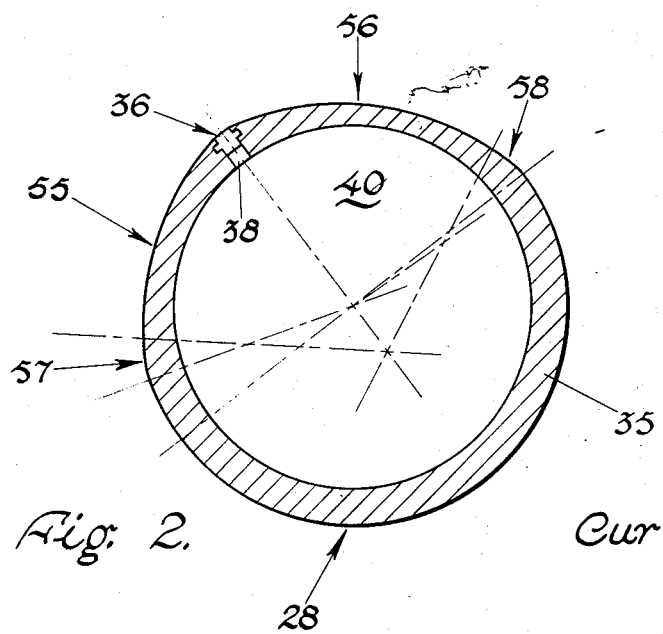
FIG. 2 is an enlarged transverse section through the bending roll of FIG. 1.

A typical bending member surface configuration, as illustrated in FIG. 2, includes contoured generally parabolic segments 55 and 56 joined to the cylindrical surface of the tubular section 28 by circular curves 57 and 58 respectively, of smaller radius than the outer surface of the tubular section 28.

By way of example, in one specific embodiment constructed in accordance with FIG. 2, the tubular section 28 had an outside diameter of 18 inches with an inside diameter of 15 inches, so that the thickness of the wall 35 in the cylindrical section was 1-½ inches. The continuous slot 36 was five-eighths inch in width and seven-eighths inch in depth with the grooves 45 being three-sixteenths inch in height and depth and located one-fourth inch below the adjacent outer surface of the tubular section. Following the contoured surface 55, the sheet was deflected through an angle of about 50° on the tank side, and in following the segment 56 on the lehr side it was deflected through an angle of about 65°. The bending member was installed with the centerline of the slot 36 inclined 25° toward the tank from the vertical.

In addition to the above, it is very important that the surface of the central tubular section 28 be of a constant contour throughout its length. This is necessary to produce a film uniformly supporting the sheet along the entire axial length of the section 28 and minimize the total amount of fluid escaping laterally beneath the sheet. As set forth below in greater detail, it has been found that not only does the wear produced vary across the width of the central tubular section 28 during use, but prior to the present invention, such wear could be corrected only by removing, building up if necessary, and machining the entire section to re-establish the desired contour.

The width of the sheet 16 is normally somewhat greater than the length of the central tubular section, which is on the order of 144 to 150 inches, and the marginal portions of the sheet ride over the bending member 25 on the knurled sleeves 30 which have an outside diameter equivalent to that of the central tubular member 28 and rotate freely in response to the passage of the glass sheet thereover. The friction between the knurled surfaces and the margins of the sheet is sufficient to prevent the sheet from narrowing or necking as it is deflected about the bending member, thus maintaining the width established by the knurled width-maintaining rolls 20. The contact between the knurled rolls 20 or the sleeves 30 and the sheet normally distorts these marginal areas, which are then removed as waste. It is, therefore, desirable to limit the width of such contact area, and it has been found that a marginal width of about 5 or 6 inches riding on the knurled sleeves is sufficient to maintain the width and guide the sheet. While the actual width of the knurled sleeves 30 may be as much as 10 inches, occasional deviations in the tracking of the sheet over the bending member may cause either of the marginal edges to extend from time to time outwardly beyond the limits of the knurled sleeves. Thus, the stationary collars 32 flanking the knurled sleeves 30, which may be fixed to the tubular extensions 33 as by set screws (not shown), are adapted to allow the margins to slide thereover without becoming fouled on the member 25.

It is desirable that the knurled sleeves 30 have an outside diameter which renders the top of the surface 31 flush with the surfaces of the wall 35 of the central tubular section 28 adjacent the top of slot 36 so as to provide a continuous support for the sheet 16. If the diameter is larger, the knurled surfaces would raise the margins of the ribbon and cause excessive amounts of the supporting fluid to escape externally of the central tubular section 28, while if it is smaller the drag produced at the extremes of central tubular section 28 would be prohibitive. Even when the outer surface 31 is flush with surface of the wall 35 flanking the slot 36, the plastic nature of the sheet 16 at the stage of the process where it deflects about the bending roll, combined with the necessity of ending the fluid mixer slot 44 and thereby diminishing the direct fluid support a short distance from the ends of the central tubular section 28, tends to produce a drooping effect in the sheet above the extreme ends of the central tubular section 28 which results in substantially more contact or drag between the sheet and supporting member in these areas. This phenomenon causes the portions of the tubular section 28 flanking the slot 36 to wear much more rapidly than the remainder of the roll, heretofore necessitating frequent removal of the roll for repair.

By the present invention, improvements are incorporated in the central tubular section 28 which greatly reduce the problem of maintenance. Thus, as best shown in FIGS. 3 and 7, the exterior portion of the wall 35 in the area of high wear beginning at the ends of the central tubular section 28 and continuous with and extending along either side of the slot 36, is constructed in the form of pairs of replaceable inserts 59. The outer surfaces 60 of the inserts are contoured to blend with the surrounding permanent surface of the central tubular section 28, and the inserts may be held in position by dovetailed tongues 61 slidably received in machined mating dovetailed grooves 62 in the tubular section. Cap screws 63 threaded into tapped counter-sunk holes 64 in the end of the tubular section and having heads which overlap recessed portions of the tongues of the inserts 59 secure the inserts axially in place. Thus, the inserts present a flush mounting to both the ends and surfaces of the central tubular section 28.

The inserts themselves are normally on the order of 4 inches in length and from 1¼ to 1½ inches in width, and may be constructed of a conventional heat resisting stainless steel alloy having expansion characteristics compatible with that forming the wall 35 of the central tubular section 28. The outer wearing surface of the inserts is generally coated with about a one-sixteenth inch layer of a heat and abrasion resistant material such as Colmonoy 6, made by the Wall-Colmonoy Corporation of Detroit, Michigan. This material is substantially harder than the base material of the insert and tubular section, so that the insert will have a useful life several times that of prior devices.

When necessitated by excessive wear, removal and replacement of the inserts can be accomplished in a short time by simply loosening the set screws holding the stationary collar in place on the tubular extension 33 and sliding both the stationary collar 32 and knurled sleeve 30 away from the central tubular section 28. The cap screws 63 can then be removed and the inserts slidably withdrawn and replaced, and the apparatus reassembled. Thus, the incorporation of the replaceable inserts of the invention greatly reduces the maintenance involved in retaining the proper contour of the surface of the central tubular member along its entire length and lengthens its useful life considerably.

We claim:

1. In apparatus for producing a continuous glass sheet, comprising a stationary bending member having a curved surface about which said continuous sheet of glass is deflected from a first path into a second path while in a highly heated softened condition, and an elongated slot in said curved surface extending longitudinally of said bending member beneath said sheet through which fluid is admitted to form a fluid film between said curved surface and said sheet, the improvement comprising a removable insert affixed to said bending member within a recess along each side of said slot and extending inwardly from the end of said bending member, said inserts defining the side walls of said slot in the end region thereof with their outer surface being flush with and a continuation of the adjacent curved surface of said bending member in the region where said sheet approaches and departs from said slot.

2. Apparatus for producing a continuous glass sheet as claimed in claim 1, in which said bending member comprises a tubular central section with said curved surface formed on its outer surface, said slot extending longitudinally throughout the length of said tubular section and including a pair of said inserts flanking and forming the side walls of said slot at each end of said tubular section, said inserts being positioned in recesses extending inwardly from the end of said tubular central section.

3. Apparatus for producing a continuous glass sheet as claimed in claim 2, including a dovetail slot in the bottom of said recess extending along and spaced from said elongated slot and a mating dovetail tongue on said insert slidably received in said dovetail slot whereby said insert is affixed to said tubular section.

4. Apparatus for producing a continuous glass sheet as claimed in claim 3, including means affixed to the end of said tubular section and engaging the end of said insert for retaining said insert in position and preventing endwise movement thereof along said dovetail slot.

5. Apparatus for producing a continuous glass sheet as claimed in claim 2, including a longitudinally extending groove in each side wall of said slot extending throughout the length of said slot and said insert at the ends thereof and a fluid dispering member within said slot for dispersing said fluid as it passes through said slot to form said film, said dispersing member having oppositely disposed flanges slidably received in said grooves.

6. Apparatus for producing a continuous glass sheet as claimed in claim 5, in which said fluid dispersing member terminates inwardly from the end of said tubular section and including a plug inserted in the end of said slot having flanges received in the grooves of said inserts for closing the end of said slot to prevent loss of fluid therefrom.

* * * * *